United States Patent
Ho et al.

(10) Patent No.: US 8,718,101 B2
(45) Date of Patent: May 6, 2014

(54) PILOT SELECTION METHOD, WIRELESS COMMUNICATION SYSTEM AND BASE STATION THEREOF

(75) Inventors: Chung-Lien Ho, Taoyuan County (TW); Chang-Lan Tsai, Hsinchu County (TW); Yan-Xiu Zheng, Taipei County (TW); Yu-Chuan Fang, Yilan County (TW)

(73) Assignee: Acer Incorporated, New Taipei (TW)

( * ) Notice: Subject to any disclaimer, the term of this patent is extended or adjusted under 35 U.S.C. 154(b) by 595 days.

(21) Appl. No.: 12/906,136

(22) Filed: Oct. 18, 2010

(65) Prior Publication Data

US 2011/0159882 A1 Jun. 30, 2011

Related U.S. Application Data

(60) Provisional application No. 61/290,768, filed on Dec. 29, 2009.

(51) Int. Cl.
- *H04B 3/10* (2006.01)
- *H04W 4/00* (2009.01)
- *H04B 7/216* (2006.01)

(52) U.S. Cl.
USPC ............................. 370/491; 370/329; 370/335

(58) Field of Classification Search
USPC ........................................................ 370/491
See application file for complete search history.

(56) References Cited

U.S. PATENT DOCUMENTS

| | | | |
|---|---|---|---|
| 7,436,758 B2 | 10/2008 | Suh et al. | |
| 7,583,586 B2 | 9/2009 | Park et al. | |
| 7,643,832 B2 | 1/2010 | Cudak et al. | |
| 7,711,029 B2 | 5/2010 | Guey | |
| 2007/0217495 A1 | 9/2007 | Han et al. | |
| 2009/0097452 A1 | 4/2009 | Gogic | |
| 2009/0135784 A1 | 5/2009 | Horn et al. | |
| 2009/0147733 A1 | 6/2009 | Choi et al. | |
| 2009/0247157 A1 | 10/2009 | Yoon et al. | |

FOREIGN PATENT DOCUMENTS

| | | |
|---|---|---|
| EP | 1978691 | 10/2008 |
| TW | 200937974 | 9/2009 |
| TW | 200952519 | 12/2009 |

OTHER PUBLICATIONS

Draft Amendment to IEEE Standard for Local and metropolitan area networks, Part 16: Air Interface for Broadband Wireless Access Systems, IEEE P802.16m/D9, Oct. 6, 2010, p. 1-p. 1156.

(Continued)

*Primary Examiner* — Shaq Taha
(74) *Attorney, Agent, or Firm* — Jianq Chyun IP Office

(57) ABSTRACT

A pilot selection method adapted for selecting rank-2 pilot patterns for a macrocell advanced base station (ABS), a femtocell ABS and a non-macrocell and non-femtocell ABS is proposed along with a wireless communication system and a base station thereof. Different rank-2 pilot pattern is selected for a femtocell ABS from its overlay macrocell ABS and non-macrocell and non-femtocell ABS rank-2 pilot patterns. Another pilot selection method for selecting a rank-1 pilot pattern for a femtocell ABS co-located with at least a macrocell ABS is also proposed. Different rank-1 pilot pattern is selected for a femtocell ABS from its overlay macrocell ABSs using rank-1 and/or rank-2 pilot patterns, where some of the macrocell ABSs can use rank-2 pilot patterns and the rest of the macrocell ABSs just use rank-1 pilot patterns. Also, different rank-1 pilot pattern is selected for the femtocell ABS from its neighboring femtocell ABSs using rank-1 pilot patterns.

10 Claims, 14 Drawing Sheets

(56) References Cited

OTHER PUBLICATIONS

Jiann-An Tsai et al., "AWD Text Proposal for Using 2 Pilot Streams for Rank-1 Precoding on Section 15.3.5.4.1", IEEE C802.16m-09/2507, submitted on Nov. 6, 2009, p. 1-p. 3.

Hangyu Cho et al., Proposed Text on DL Pilot Patterns with one data stream (15.3.5.4.1), IEEE C802.16m-09/2367, submitted on Nov. 6, 2009, p. 1-p. 6.

"3rd Generation Partnership Project; Technical Specification Group Radio Access Network; Evolved Universal Terrestrial Radio Access (E-UTRA); Physical Channels and Modulation (Release 9)", 3GPP TS 36.211 V9.1.0 (Mar. 2010), p. 1-p. 85.

"Extended European Search Report of Europe Counterpart Application(Application No. 10195941.9)", issued on Mar. 30, 2011, p. 1-p. 12.

"Extended European Search Report of Europe Counterpart Application(Application No. 10195943.5)", issued on Mar. 30, 2011, p. 1-p. 11.

"Part 16: Air Interface for Fixed and Mobile Broadband Wireless Access Systems", IEEE P802.16m/D3, XP007917563, Issued on Dec. 8, 2009, pp. 1-673.

Chung-Lien Ho et al., "Text Proposal of SA-Preamble Selection for Different ABS Types on Section 16.3.6.1.2", IEEE C802. 16m-10/0047, Issued on Dec. 31, 2009, pp. 1-4.

Chung-Lien Ho et al., "Text Proposal of Rank-1 Pilot Selection for Femto ABS on Section 16.3.5.4.1", IEEE C802.16m-10/0046, Issued on Dec. 31, 2009, pp. 1-12.

"Notice of Allowance of Taiwan counterpart application" issued on Oct. 31, 2013, p1-p4.

PILOT SELECTION METHOD, WIRELESS COMMUNICATION SYSTEM AND BASE STATION THEREOF

CROSS-REFERENCE TO RELATED APPLICATION

This application claims the priority benefit of U.S. provisional application Ser. No. 61/290,768, filed on Dec. 29, 2009, all disclosures are incorporated therewith.

BACKGROUND

1. Technical Field

The disclosure relates to a pilot selection method for different types of base stations in a heterogeneous wireless communication network, a wireless communication system and a base station thereof.

2. Related Art

In OFDMA wireless communication system, pilot patterns for different numbers of transmission streams have been completely defined in several wireless communication standards such as 3GPP LTE and IEEE 802.16m, and associated pilot selection methods have also been proposed. The transmission of pilot sub-carriers in downlink is necessary for enabling channel estimation, measurements of channel quality indicators such as the signal-to-interference ratio (SINR), frequency offset estimation and so forth. In order to avoid channel estimation error induced by pilot collision which often occurs at cell edges, interlaced pilot patterns are used in cellular wireless communications.

FIG. 1A is a schematic diagram illustrating a cluster 10 of three cells in a cellular wireless communication network. Referring to FIG. 1A, the cluster 10 is a common grouping of three cells 110, 120 and 130 all being within coverage of a base station tower 140. Cell identifications (ID) 111, 121 and 131 enclosed in solid lines respectively represent cell IDs for cells 110, 120 and 130; segment ID 113, 123 and 133 enclosed in dashed lines respectively represent segments IDs for cells 110, 120 and 130. The cluster 10, figures of cell ID and segment ID shown in FIG. 1A are just for an exemplary example.

FIG. 1B is a schematic diagram illustrating a rank-2 interlaced pilot patterns in IEEE 802.16m standard, where the rank-2 pilot patterns refer to a situation where a base station transmits two streams of data through at least two antennas. FIG. 1B illustrates three different pilot pattern sets P0, P1 and P2. Each of the pilot pattern sets P0, P1 and P2 contains 6 OFDM symbols, in which each of the OFDM symbols contains 18 contiguous sub-carriers. The resource elements with figures of 1 and 2 inside (such as a block 150 enclosed in a dashed line) in the resource unit are just an example indicating where the pilots appear in the pilot pattern set P0. Interlaced pilot patterns are generated by cyclic shifting the base pilot patterns (i.e., pilot pattern set P0 in FIG. 1B). The interlaced pilot patterns are used by different advanced base stations (ABS) for one and two streams. The interlaced pilot patterns for one stream (i.e., rank-1) are shown in FIG. 1C.

FIG. 1C is a schematic diagram illustrating a rank-1 interlaced pilot patterns in IEEE 802.16m standard, where the rank-1 pilot patterns refer to a situation where a base station transmits just one stream of data through at least an antenna. FIG. 1C illustrates three different interlaced pilot pattern sets IP0, IP1 and IP2. The interlaced pilot pattern set IP0 includes two different interlaced pilot pattern streams IPS0 and IPS1; the interlaced pilot pattern set IP1 includes two different interlaced pilot pattern streams IPS2 and IPS3; the interlace pilot pattern set IP2 includes two different interlaced pilot pattern streams IPS4 and IPS5. Each of the interlaced pilot pattern streams IPS0, IPS1, IPS2, IPS3, IPS4 and IPS5 contains 6 OFDM symbols, in which each of the OFDM symbols contains 18 contiguous sub-carriers. The resource element with a figure of 1 inside (such as a block 152 enclosed in a dashed line) in the interlaced pilot pattern stream IPS0 is just an exemplary example indicating where the pilots appear in the interlaced pilot pattern stream IPS0.

As shown in FIG. 1C, six of interlaced pilot patterns (i.e., interlaced pilot pattern streams) can be used for one data stream. The index of the pilot pattern set used by a particular ABS with IDcell=k is denoted by $p_k$. The index, $p_k$, of the pilot pattern set is determined by the IDcell according to the following equation (1).

$$p_k = \mathrm{floor}\left(\frac{k}{256}\right) \quad \text{equation (1)}$$

In IEEE 802.16m, two conventional pilot selection schemes have been proposed for support of macrocells. One is proposed based on the cell-ID and mobile station ID (STID), and the other is proposed based only on the cell-ID. The rank-1 pilot patterns of the first pilot selection scheme are similar as shown in FIG. 1C. The associated rank-1 pilot selection is proposed as function of cell-ID, k and STID, m, as the follow equation (2):

$$p_k = \mathrm{floor}\left(\frac{k}{256}\right) \quad \text{equation (2)}$$
$$s_m = \mathrm{mod}(m+k, 2) + 1, m = 0, 1, 2$$

In equation (2), the index of the pilot pattern set is denoted by $p_k$ for a particular ABS with IDcell=k, and $s_m$ stands for a pilot stream with a station ID m in a particular pilot pattern set. FIG. 1D is a schematic diagram illustrating a cell deployment scheme. The cell deployment scheme 16 includes a plurality of clusters consisting of three cells in each of the clusters as similar to that of FIG. 1A, where a cluster 160, as an example, includes a base station tower 162 covering three cells with cell ID as 3, 259 and 515 respectively. The first pilot selection scheme can be applied in the cell deployment scheme 16.

The rank-1 pilot patterns of the second pilot selection scheme are similar as being shown in FIG. 1C. The associated rank-1 pilot selection is proposed as a function of the cell-ID, k, only as the following equation (3):

$$p_k = \mathrm{floor}\left(\frac{k}{256}\right) \quad \text{equation (3)}$$
$$s_k = \mathrm{mod}(k, 2)$$

In the equation (3), the index of the pilot pattern set is denoted by $p_k$ for a particular ABS with IDcell=k, and $s_k$ stands for a pilot stream in a particular pilot pattern set. FIG. 1E is a schematic diagram illustrating another cell deployment scheme. The cell deployment scheme 18 includes a plurality of clusters consisting of three cells in each of the clusters similar to that shown in FIG. 1A. A cluster 184, as an example, includes three cells with cell ID of 13, 269 and 525; another cluster 182, as another example, includes three cells with cell ID of 16, 272 and 528. The second pilot selection scheme can be applied in the cell deployment scheme 18.

The above-described pilot selection methods are just for a single transmission link, such as in the macrocell transmission. However, there cane be different types of advanced base station (ABS) other than the macrocell base station. For example, in IEEE 802.16m, there are specific ABS types such as macrocell advanced BS (ABS), macro Hotzone ABS, or femtocell ABS. The ABS types may be categorized into macrocell ABS and non-macrocell ABS by hard partition with 258 sequences (86 sequences per segment multiplied by 3 segments) dedicated for macrocell ABS. Moreover, the non-macrocell ABS is classified in a hierarchical structure. Cell type of non-macrocell ABS is partitioned as a public ABS and a closed subscriber group (CSG) femtocell ABS. The public ABS can be further categorized into different types such as: a hotzone ABS, a relay ABS, an open subscriber group (OSG) femtocell ABS and so forth. The CSG femtocell ABS can be further categorized such as: a CSG-closed ABS and a CSG-open ABS.

There is currently no method proposed on the pilot selection for support of the above heterogeneous wireless communication networks. Different types of transmission networks, such as the macrocell and non-macrocell networks, in which one is overlapped by the other, form a typical heterogeneous network deployment such as a macro-femto (i.e., macrocell-femtocell) heterogeneous network. In the macro-femto heterogeneous network, interference can easily occur because data can be transmitted across two different transmission links. Therefore, it is an important issue to find an effective and efficient pilot selection scheme so as to ensure a more reliable data transmission in such heterogeneous wireless communication network.

SUMMARY

A pilot selection method is introduced herein. The pilot selection method is adapted for selecting pilot patterns for at least a public advanced base station (ABS), at least a closed subscriber group (CSG) femtocell ABS and at least a macrocell ABS in a heterogeneous wireless communication network. According to an exemplary embodiment, the pilot selection method includes the following steps. For the public ABS and the CSG femtocell ABS, different segments to a segment of the macrocell ABS are used, where the public ABS and the CSG femtocell ABS are co-located with the macrocell ABS. A segment different to that of the CSG femtocell ABS is selected for the public ABS.

A pilot selection method is introduced herein. The pilot selection method is adapted for selecting rank-1 pilot pattern for a femtocell advanced base station (ABS) overlay with at least a macrocell ABS in a heterogeneous wireless communication network, and includes following steps. Different rank-1 pilot pattern is used for the femtocell ABS from rank-1 and/or rank-2 pilot patterns used by the at least a macrocell ABS, where some of the at least a macrocell ABS use rank-2 pilot patterns and the rest of the macrocell ABS just use rank-1 pilot patterns.

A wireless communication system is introduced herein. According to an exemplary embodiment, the wireless communication system includes at least a macrocell advanced base station (ABS), at least a public ABS, and at least a closed subscriber group (CSG) femtocell ABS. The public ABS and the CSG femtocell ABS are co-located with the macrocell ABS, where different segments to a segment of the macrocell ABS are used respectively for of the public ABS and the CSG femtocell ABS, and a different segment to that of the CSG femtocell ABS is selected for the public ABS.

A wireless communication system is introduced herein. According to an exemplary embodiment, the wireless communication system includes a femtocell advanced base station (ABS), and at least a macrocell ABS. The femtocell ABS is overlay with the macrocell ABS, where different rank-1 pilot pattern is used for the femtocell ABS from rank-1 and/or rank-2 pilot patterns used by the at least a macrocell ABS, where some of the at least a macrocell ABS use rank-2 pilot patterns and the rest of the macrocell ABS just use rank-1 pilot patterns.

A base station (BS) is introduced herein. According to an exemplary embodiment, the BS is co-located with a macrocell advanced BS (ABS) and neighboring to at least a public ABS, where the BS uses a different segment to a segment of the macrocell ABS, and the BS selects a different segment to that of the public ABS.

A base station (BS) is introduced herein. According to an exemplary embodiment, the BS is overlay with at least a macrocell advanced BS (ABS), where rank-1 pilot pattern used for the BS is different from rank-1 and/or rank-2 pilot patterns used by the at least a macrocell ABS, where some of the at least a macrocell ABS use rank-2 pilot patterns and the rest of the at least a macrocell ABS just use rank-1 pilot patterns.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DESCRIPTION OF THE EXEMPLARY EMBODIMENTS

Figure 1A:
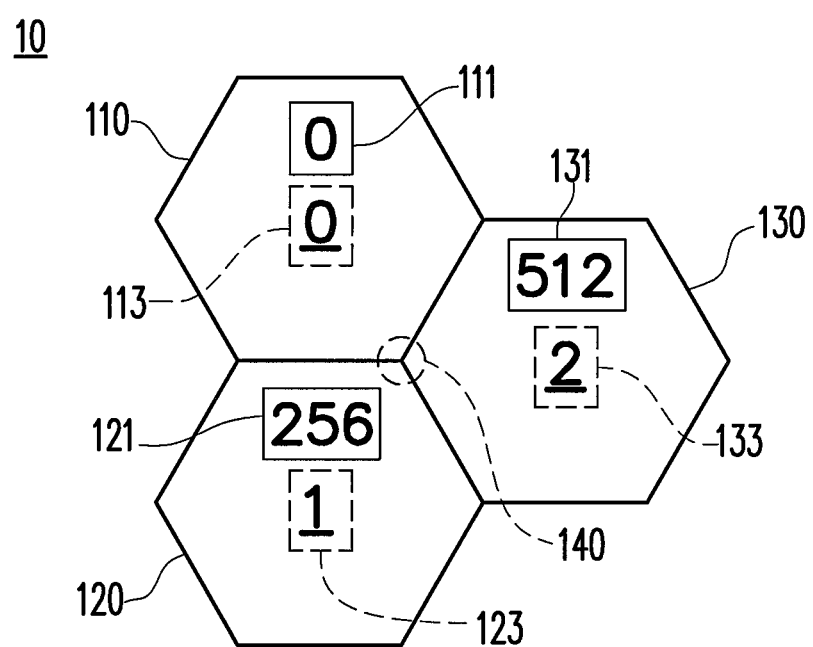
FIG. 1A is a schematic diagram illustrating a cluster of three cells in a cellular wireless communication network.
Figure 1B:
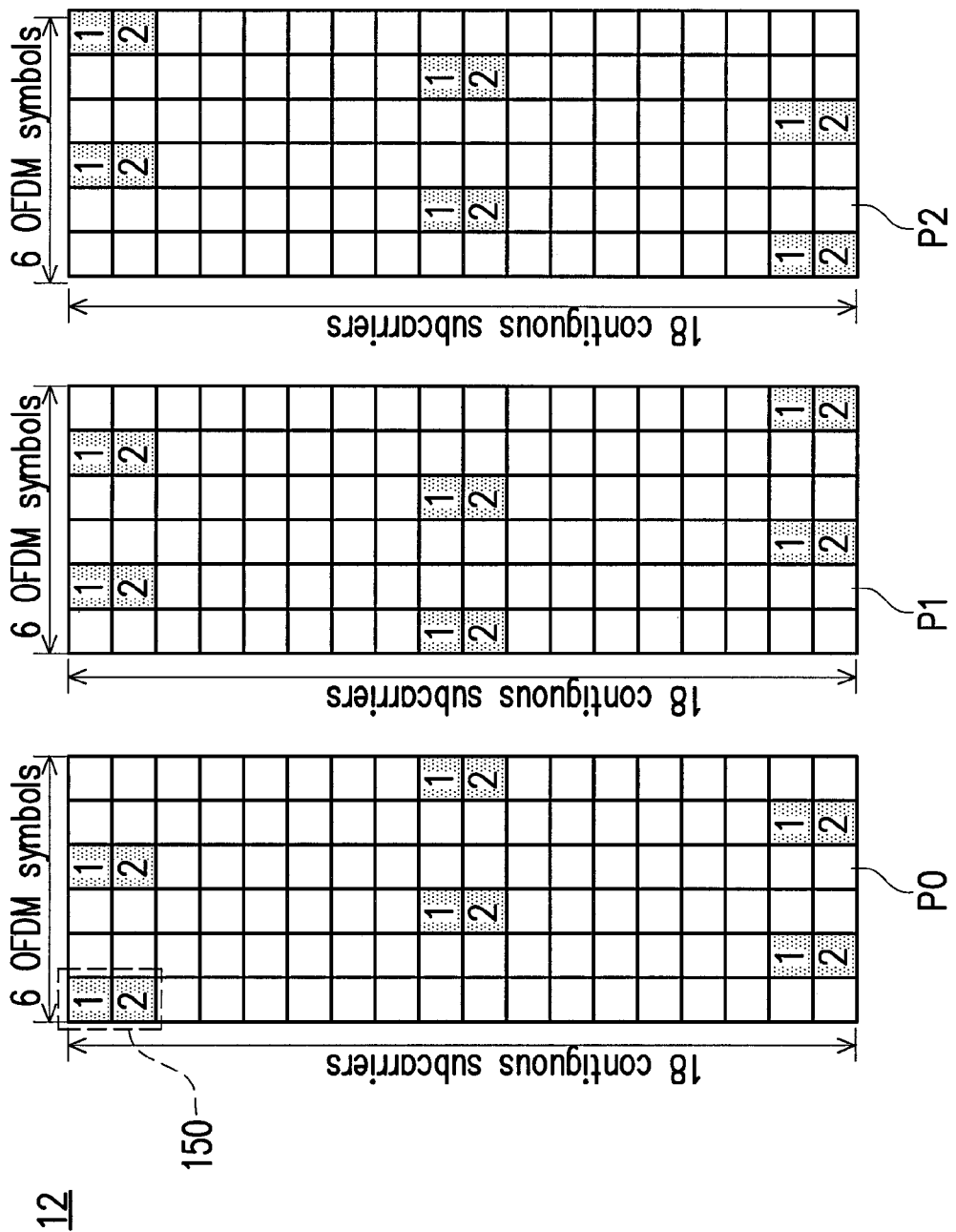
FIG. 1B is a schematic diagram illustrating a rank-2 interlaced pilot patterns in IEEE 802.16m standard.
Figure 1C:
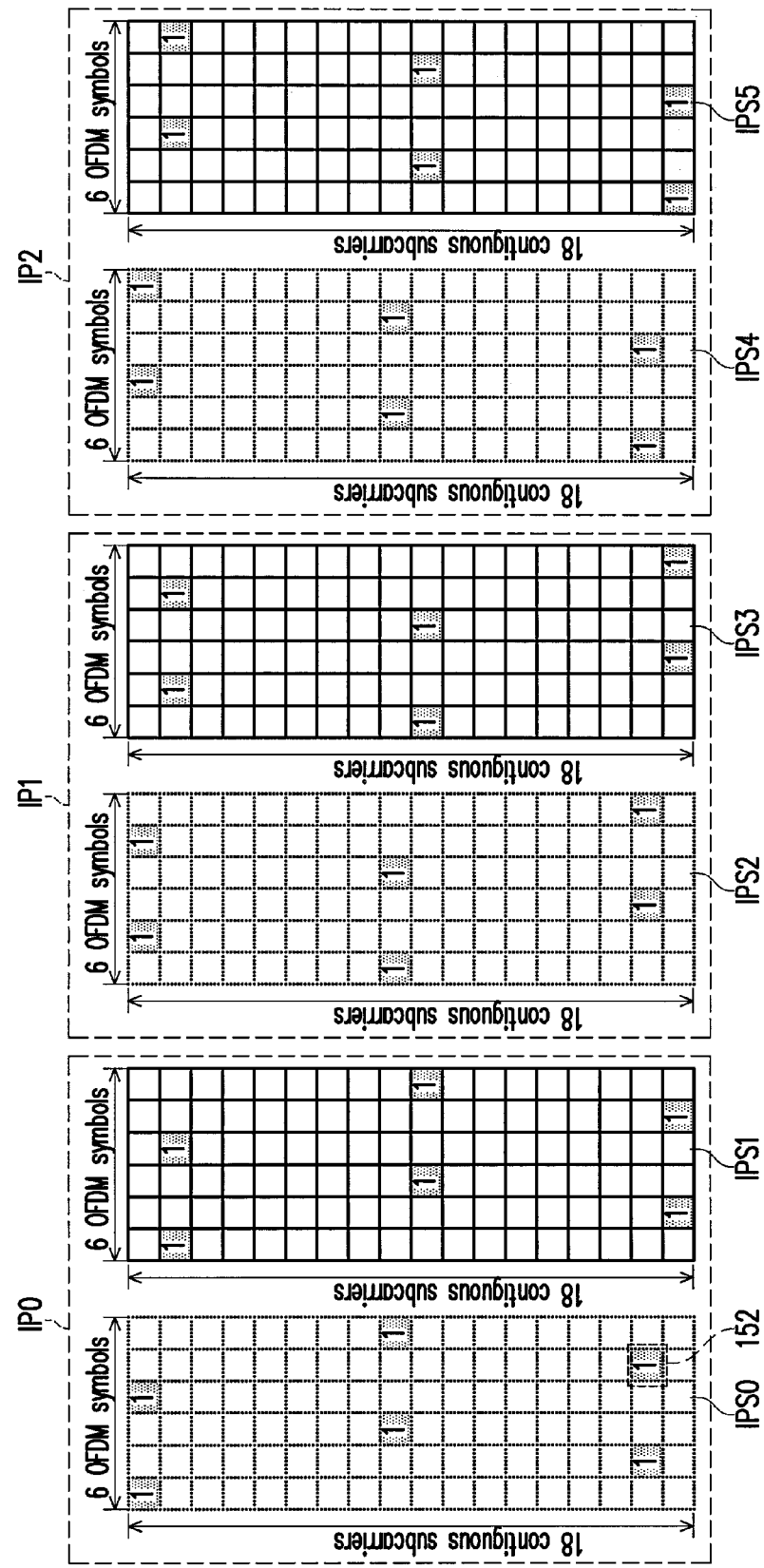
FIG. 1C is a schematic diagram illustrating a rank-1 interlaced pilot patterns in IEEE 802.16m standard.
Figure 1D:
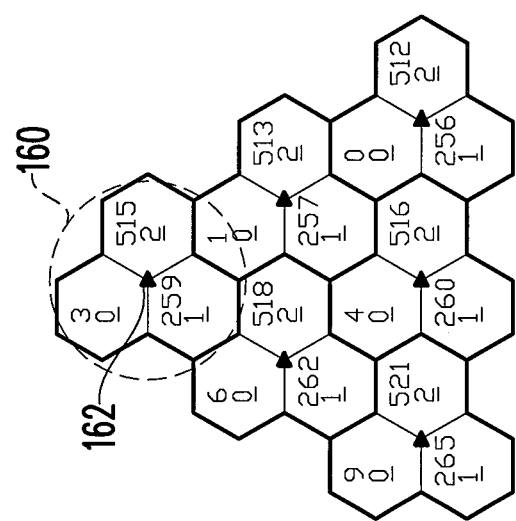
FIG. 1D is a schematic diagram illustrating a cell deployment scheme.
Figure 1E:
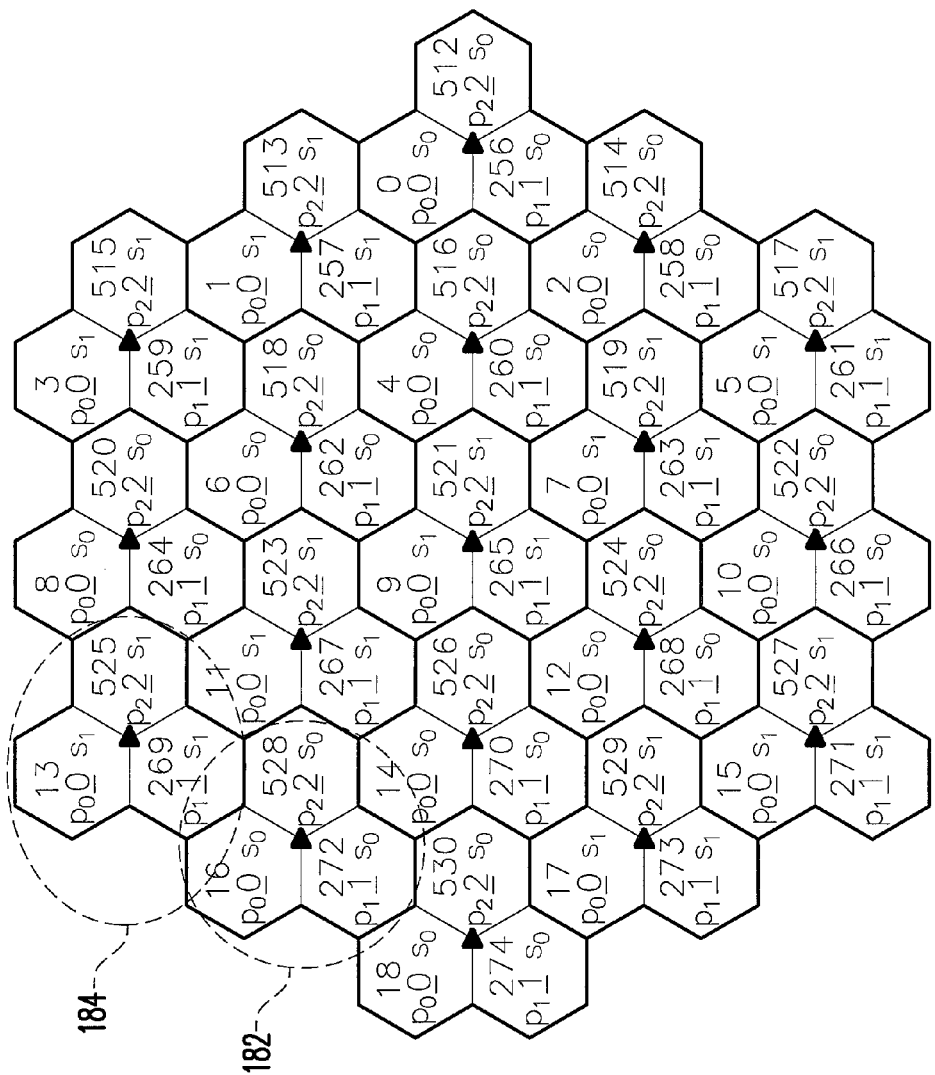
FIG. 1E is a schematic diagram illustrating another cell deployment scheme.

Reference will now be made in detail to the exemplary embodiments of the present disclosure, examples of which are illustrated in the accompanying drawings. Wherever possible, the same reference numbers are used in the drawings and the description to refer to the same or like parts.

Figure 4:
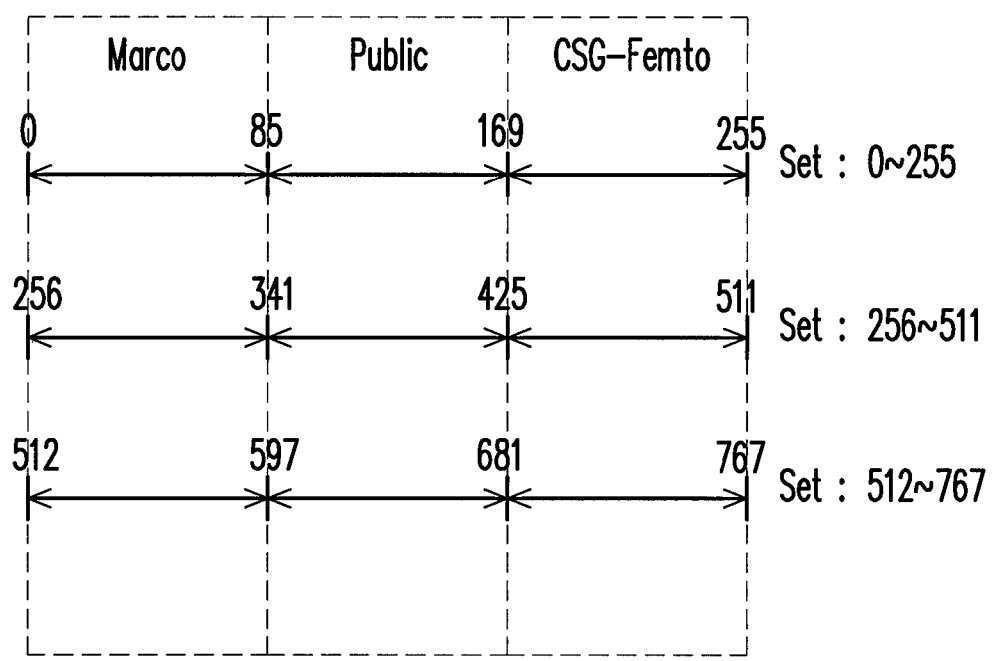
FIG. 4 is a schematic diagram illustrating a partition of base station and corresponding base station identifiers.

A pilot selection method is proposed, and the pilot selection method is adapted for rank-1 pilot patterns and rank-2 pilot patterns in heterogeneous wireless communication networks, in which the data transmissions can be simultaneously done over two different types of transmission networks, such as the macrocell and non-macrocell network, where one is overlapped by the other. A typical heterogeneous network deployment can be the macro-femto heterogeneous network. In the macro-femto heterogeneous network, interference due to pilot stream transmitted across two different transmission links can be avoided or lowered through the pilot selection method. In the following, three ABS types are assumed for simplicity of illustration such as: advanced macrocell base station (ABS), public ABS, and femtocell ABS, where the associated cell IDs are shown in FIG. 4. The femtocell ABS can be, for example, a closed subscriber group (CSG) femtocell ABS, and the public ABS can be, for example, a relay ABS. In general, cell IDs can be categorized according to a number of ABS types and the associated ID range of each ABS type can be varied.

Figure 2:
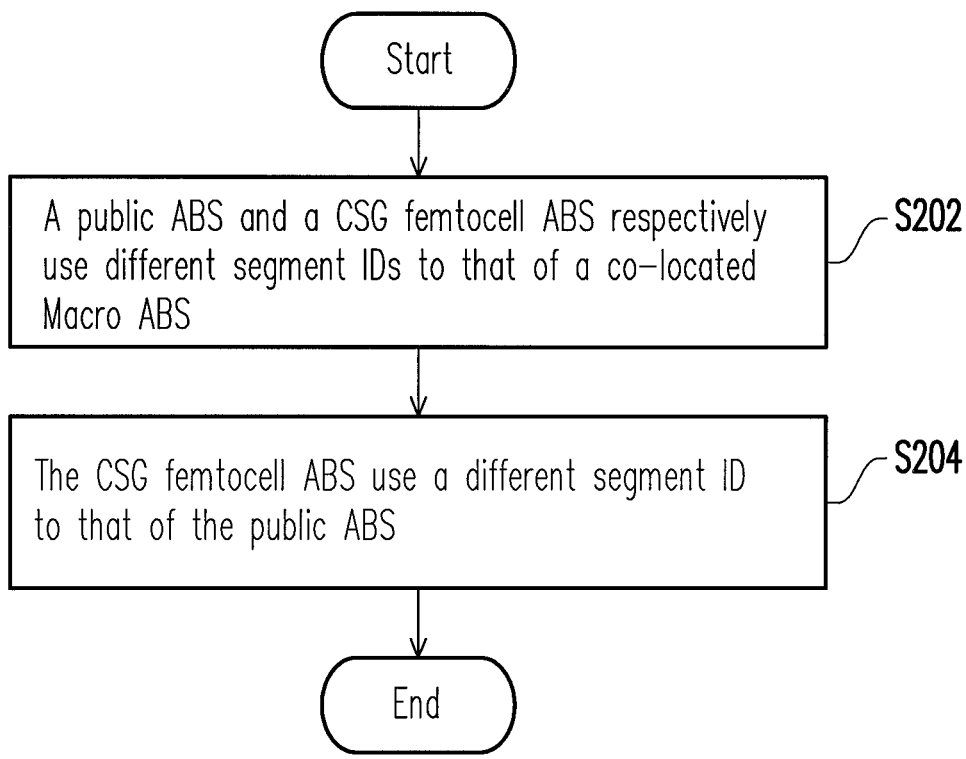
FIG. 2 is a schematic flowchart illustrating a pilot selection method according to a first exemplary embodiment.

FIG. 2 is a schematic flowchart illustrating a pilot selection method 20 according to a first exemplary embodiment. The pilot selection method 20 starts at a step S202, where a public ABS and a CSG femtocell ABS respectively use different segments (or segment IDs) to that of a co-located macro ABS. The public ABS (such as a relay ABS) and the CSG femtocell ABS (such as a femtocell ABS) are all within coverage of a macrocell ABS. Then, the public ABS and a CSG femtocell ABS respectively use a first segment ID and a second segment ID, while the macro ABS uses a third segment ID. The first segment ID and a second segment ID are different from the third segment ID of the macro ABS. Here, different segment IDs refer to different segments, and further refer to different pilot patterns set (in rank-2 pilot patterns) and even refer to different pilot pattern stream set (in rank-1 pilot patterns).

In step S204, the CSG femtocell ABS use a different segment ID to that of the public ABS. The public ABS and a CSG femtocell ABS respectively use the first segment (or the first segment ID) and the second segment (or the second segment ID), where the first segment ID is different from the second segment ID. The pilot selection method 20 is terminated at the step S404. The pilot selection method 20 can be applied to any one of heterogeneous wireless networks, where the heterogeneous wireless network can include a macrocell ABS, a CSG femtocell ABS and/or a public ABS. General concepts of the pilot selection method 20 can be described as the following. Different rank-2 pilot pattern is selected for a femtocell ABS from its overlay macrocell and non-macrocell and non-femtocell rank-2 pilot patterns.

Figure 3A:
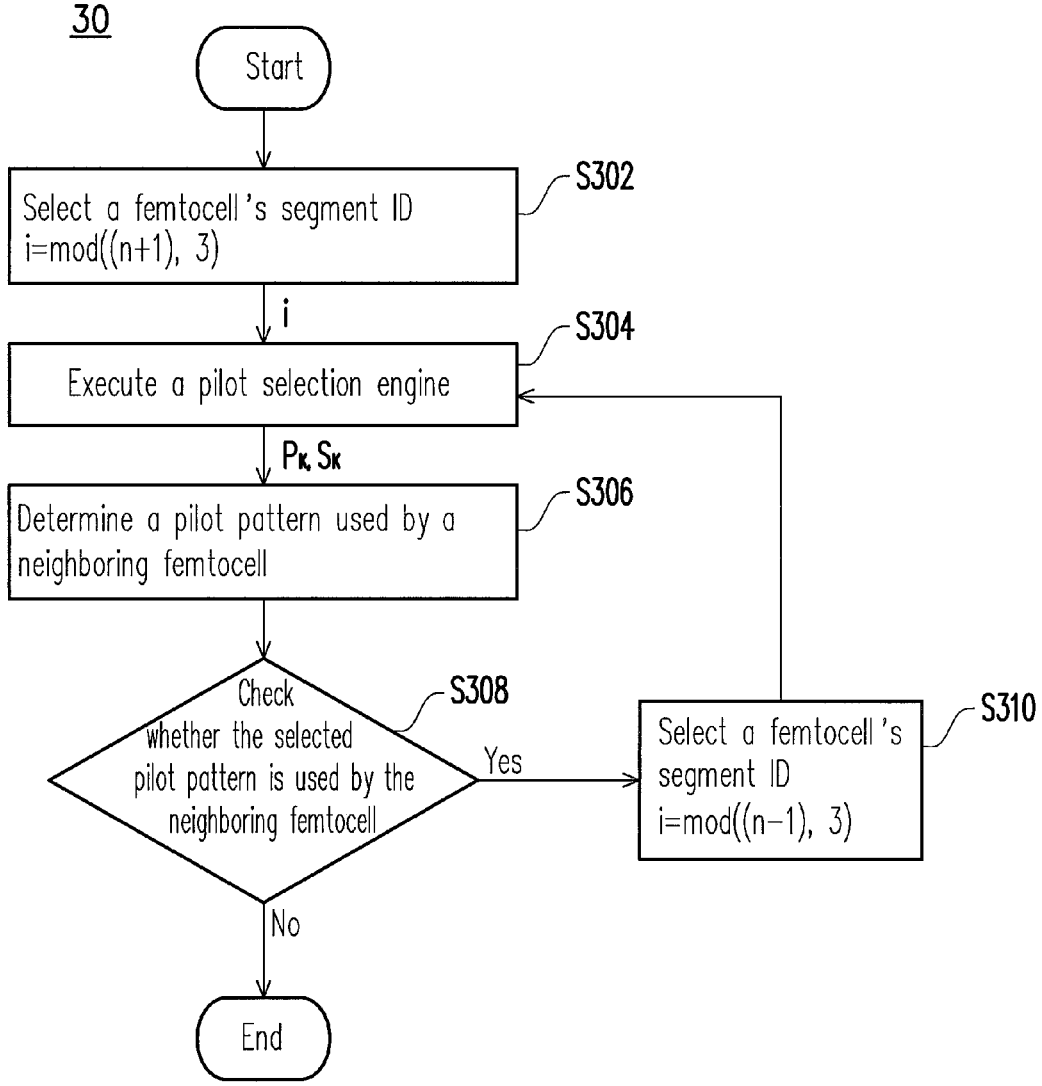
FIG. 3A is a schematic flowchart illustrating another pilot selection method according to a second exemplary embodiment.

FIG. 3A is a schematic flowchart illustrating another pilot selection method 30 according to a second exemplary embodiment. The pilot selection method 30 starts at step S302, where a femtocell ABS's segment ID is selected according to the following equation (4):

$$i=\mathrm{mod}((n+1),3) \quad \text{equation (4)}$$

In the equation (4), i denotes the segment ID of the femtocell ABS, n denotes a segment ID of a macrocell ABS, in which the femtocell ABS is located, and mod is modulo function. In step S304, a pilot selection engine is executed to find a pilot pattern set $p_k$ and a pilot pattern stream set $s_k$, based on the femtocell ABS's segment ID i.

In step S306, a pilot pattern used by a neighboring femtocell ABS is determined. In other embodiments of the present disclosure, the step S306 can also be modified as to determine a pilot pattern used by a neighboring macrocell ABS or a neighboring public ABS. In step S308, check whether the selected pilot pattern is used by the neighboring femtocell ABS. Similar, in other embodiments of the present disclosure, the step S308 can also be modified as to check whether the selected pilot pattern is used by the neighboring macrocell ABS or the neighboring public ABS. If the selected pilot pattern is used by the neighboring femtocell ABS, then after the step S308, step S310 is executed; otherwise, if the selected pilot pattern is not used by the neighboring femtocell ABS, then the pilot selection method 30 is terminated after the step S308.

In the step S310, a femtocell ABS's segment ID is selected according to the following equation (5):

$$i=\mathrm{mod}((n-1),3) \quad \text{equation (5)}$$

After the step S310, the pilot selection method 30 returns to the step S304. The detailed procedures of the step S304 will be further described in accordance with FIG. 3B.

General concepts of the pilot selection method 30 can be described as the following. Different rank-1 pilot pattern is selected for a femtocell ABS from its overlay macrocell ABSs using rank-1 and/or rank-2 pilot patterns, where some of the macrocells can use rank-2 pilot patterns and the rest of the macrocells just use rank-1 pilot patterns. Also, different rank-1 pilot pattern is selected for the femtocell ABS from its neighboring femtocell ABSs using rank-1 pilot patterns.

Figure 3B:
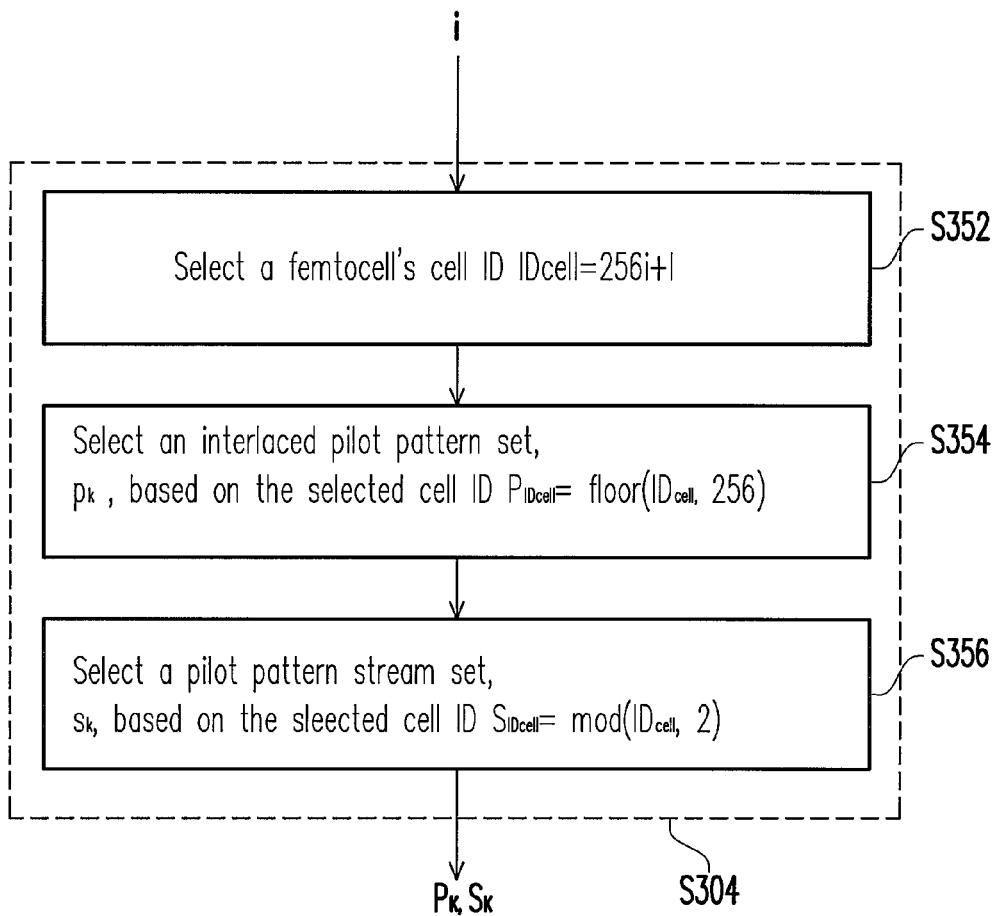
FIG. 3B is a schematic flowchart illustrating detailed procedures of a pilot selection engine according to the second exemplary embodiment.

FIG. 3B is a schematic flowchart illustrating detailed procedures of a pilot selection engine (as previously illustrated in the step S304 shown in FIG. 3A) according to the second exemplary embodiment. In step S352, a femtocell ABS's cell ID, IDcell, is selected according the following equation (6):

$$\mathrm{IDcell}=256i+l \quad \text{equation (6)}$$

In equation (6), i denotes the segment ID and l=2 mod(q, 128)+⌊q/128⌋ with q being a running index from 0 to 255, where ⌊x⌋ is floor function of x. In step S354, an interlaced pilot pattern set, $p_k$, is selected based on the selected cell ID, IDcell, according the following equation (7):

$$P_{IDcell}=\mathrm{floor}(\mathrm{IDcell},256) \quad \text{equation (7)}$$

In step S356, a pilot pattern stream set, $s_k$, is selected based on the selected cell ID, IDcell, according the following equation (8):

$$S_{IDcell}=\mathrm{mod}(\mathrm{IDcell},2) \quad \text{equation (8)}$$

In equation (8), mod is modulo function.

FIG. 4 is a schematic diagram illustrating a partition of base station types and corresponding base station identifiers. The base station types can be categorized into macrocell ABS cells and non-macro ABS cells by a hard partition with 256 sequences (sequences of the base station identifiers) as shown in FIG. 4, in which each one of the partitions can include different number of sequences. For example, in a set 1, a set 2 and a set 3, there are 256 sequences separated into a macrocell ABS, a public ABS and a CSG-femtocell ABS in each set. In the set 1, the sequences of the macrocell ABS are from 0 to 85, the sequences of the public ABS are from 86 to 169 and the sequences of the CSG-femtocell ABS are from 170 to 255. Similarly, in the set 2, the sequences of the macrocell ABS are from 256 to 341, the sequences of the public ABS are from 342 to 425 and the sequences of the CSG-femtocell ABS are from 426 to 511; in the set 3, the sequences of the macrocell ABS are from 512 to 597, the sequences of the public ABS are from 598 to 681 and the sequences of the CSG-femtocell ABS are from 682 to 767. The non-macro ABS is classified in a hierarchical structure. The non-macro ABS cell type can be partitioned as public ABS and Closed Subscriber Group (CSG) femtocell ABS. The public ABS can be further categorized into different types such as: hotzone ABS, relay ABS, Open Subscriber Group (OSG) femtocell ABS and so forth. The CSG femtocell ABS can be further categorized into different types such as: CSG-closed ABS and CSG-open ABS.

Figure 5:
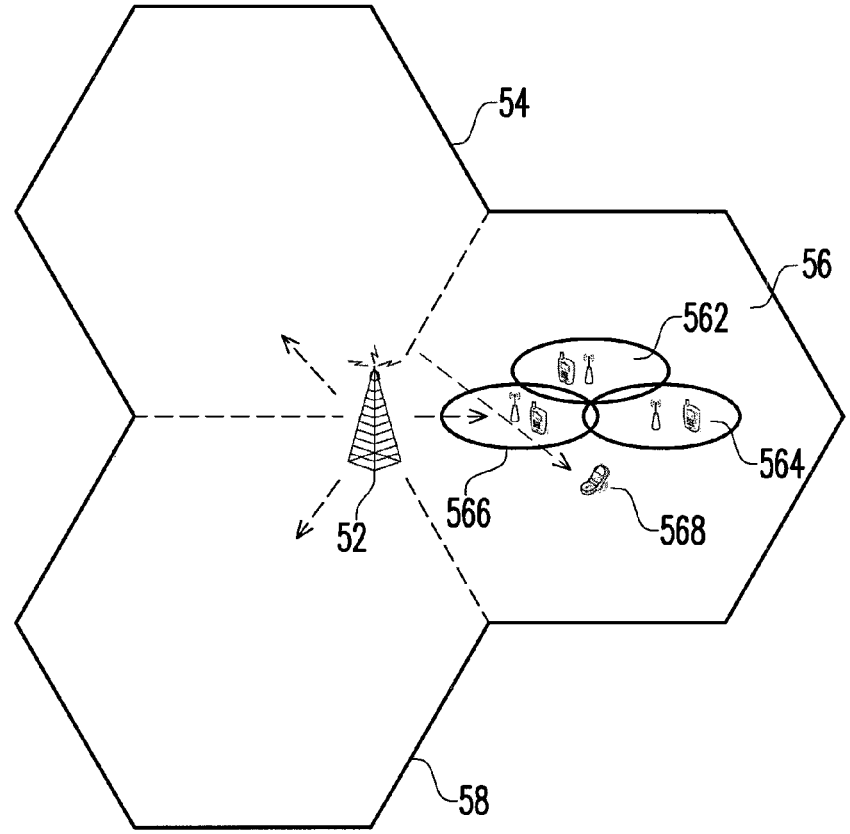
FIG. 5 is a schematic diagram illustrating a cell deployment example according to a third exemplary embodiment.

FIG. 5 is a schematic diagram illustrating a cell deployment example according to a third exemplary embodiment. A cell deployment example 50 illustrates a cross-tier (femtocell-macrocell) and an intra-tier (femtocell-femtocell) interference scenario, in which the cell deployment example 50 includes a cluster consisting of a macrocell 54, a macrocell 56 and a macrocell 58 all being within a coverage of a macrocell ABS 52. The macrocell 56 includes at least a mobile station 568 and three femtocell BSs such as a femtocell ABS 562, a femtocell ABS 564 and a femtocell ABS 566. In the third exemplary embodiment, a femtocell ABS 562, a femtocell ABS 564 and a femtocell ABS 566 are all close to the macrocell ABS 52. In the third exemplary embodiment, the femtocell ABS 562, the femtocell ABS 564 and the femtocell ABS 566 all use rank-1 pilot pattern.

In the third exemplary embodiment, the cell ID of the macrocell 54, the macrocell 56 and the macrocell 58 are respectively 1, 513 and 257. According to the segment deployment for a cell (also see the cluster diagram shown in FIG. 1A for a reference), the segment ID of the macrocell 54, the macrocell 56 and the macrocell 58 can be respectively selected as 0, 2 and 1. The femtocell ABS 562, the femtocell ABS 564 and the femtocell ABS 566 are all located in the macrocell 56 (with the segment ID n=2). Thus, according to the equation (4) and the equation (6), when a segment ID of the femtocell ABS 564 is chosen as i=0, and l=172, the cell ID, IDcell, of the femtocell ABS 564 will be 172. Furthermore, according the pilot selection engine described above, pilot pattern $p_0 s_0$ will be selected which is the same as that of femtocell with the cell ID of the femtocell ABS 562 (i.e., IDcell=170). The pilot pattern $p_m s_n$ represents the pilot pattern with the $(m+1)^{th}$ interlaced pilot pattern set and the $(n+1)^{th}$ pilot pattern stream set, and this representation is used thereinafter. The segment ID of the femtocell ABS 564 will be changed as i=1 according to the equation (5), and the cell ID, IDcell, of the femtocell ABS 564 will be 426 with l=170. Then the pilot pattern will be regenerated as $p_1 s_0$. The pilot pattern $p_0 s_0$ and pilot pattern $p_1 s_0$ are generated according to the step S352 to the step S356, and the detailed calculation procedures are not repeated herein since the one of ordinary skill in the art can easily obtain pilot patterns for the femtocell ABS 562, the femtocell ABS 564 and the femtocell ABS 566 by following the procedures illustrated in FIG. 3A and FIG. 3B.

Figure 6:
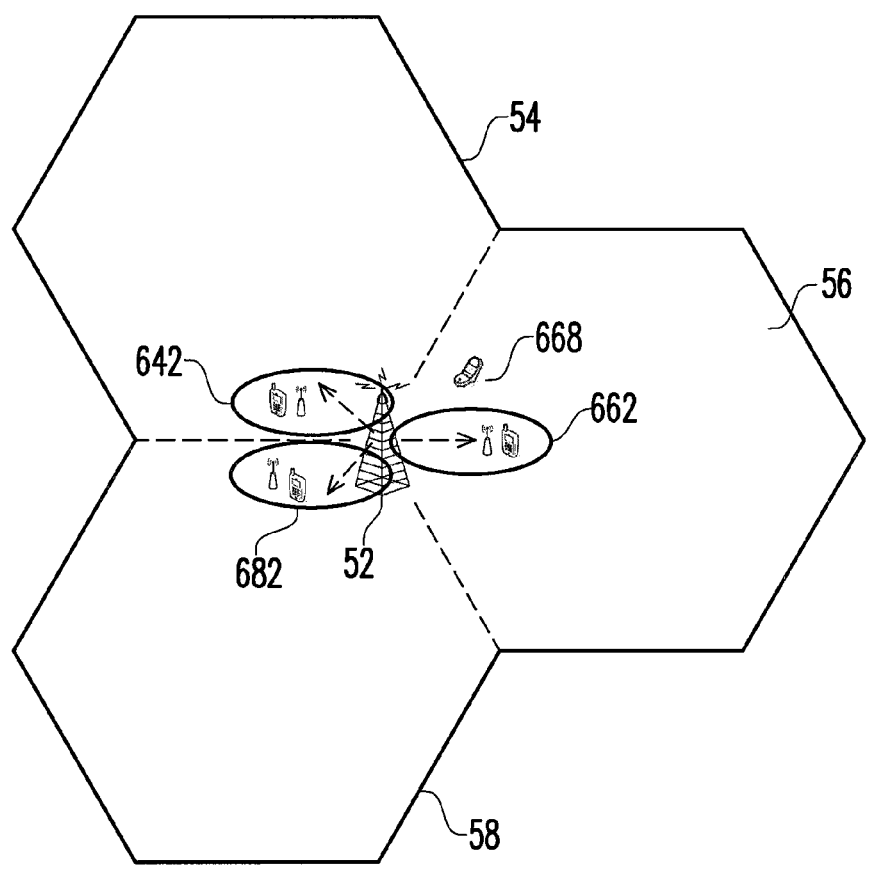
FIG. 6 is a schematic diagram illustrating a cell deployment example according to a fourth exemplary embodiment.

FIG. 6 is a schematic diagram illustrating a cell deployment example according to a fourth exemplary embodiment. A cell deployment example 60 illustrates both a cross-tier (femtocell-macrocell) and an intra-tier (femtocell-femtocell) interference scenario, in which the cell deployment example 60 includes a cluster consisting of a macrocell 54, a macrocell 56 and a macrocell 58 all being within coverage of a macrocell ABS 52. The difference between the cell deployment example 50 and the cell deployment example 60 is that a femtocell ABS 642, a femtocell ABS 662 and a femtocell ABS 682 all are very close to the macrocell ABS 52. This exemplary scenario rarely occurs since a femtocell ABS is usually deployed at cell edges of a macrocell for enhancement of coverage. The macrocell ABS 52 includes at least a mobile station 668. The macrocell 54, the macrocell 56 and the macrocell 58 respectively include at least a mobile station, and the cell IDs of the macrocell 54, the macrocell 56 and the macrocell 58 are respectively 1, 513 and 257. According to the cluster diagram shown in FIG. 1A, the segment IDs of the macrocell 54, the macrocell 56 and the macrocell 58 are respectively selected as 1, 0 and 2.

In the fourth exemplary embodiment, the femtocell ABS 642, the femtocell ABS 662 and the femtocell ABS 682 are respectively located in the macrocell 54 (with a segment ID n=0), the macrocell 56 (with a segment ID n=2) and the macrocell 58 (with a segment ID n=1). Thus, according to the equation (4) and the equation (6), when a segment ID of the femtocell ABS 642 is as i=1, and l=170, then the cell ID, IDcell, of the femtocell ABS 642 will be 426. Similarly, a segment ID of the femtocell ABS 662 is as i=0, and a segment ID of the femtocell ABS 682 is as i=2. The cell ID, IDcell, of the femtocell ABS 662 and the femtocell ABS 682 will be respectively 170 and 682. In addition, the femtocell ABS 642, a femtocell ABS 662 and a femtocell ABS 682 all use rank-1 pilot pattern.

Furthermore, according the pilot selection engine described above, a pilot pattern $p_1 s_0$ is selected for the femtocell ABS 642, a pilot pattern $p_0 s_0$ is selected for the femtocell ABS 662 and a pilot pattern $p_2 s_0$ is selected for the femtocell ABS 682. The pilot pattern $p_1 s_0$, the pilot pattern $p_0 s_0$ and the pilot pattern $p_2 s_0$ are generated according to the step S352 to the step S356. The equation (5) is not used in the fourth exemplary embodiment since the selected pilot patterns are different just by using the equation (4) and the equation (6) and following the step S352 to the step S356. The detailed calculation procedures are not repeated herein since the one of ordinary skill in the art can easily obtain the pilot pattern result by following the procedures illustrated in FIG. 3A and FIG. 3B for the femtocell ABS 642, the femtocell ABS 662 and the femtocell ABS 682.

Figure 7:
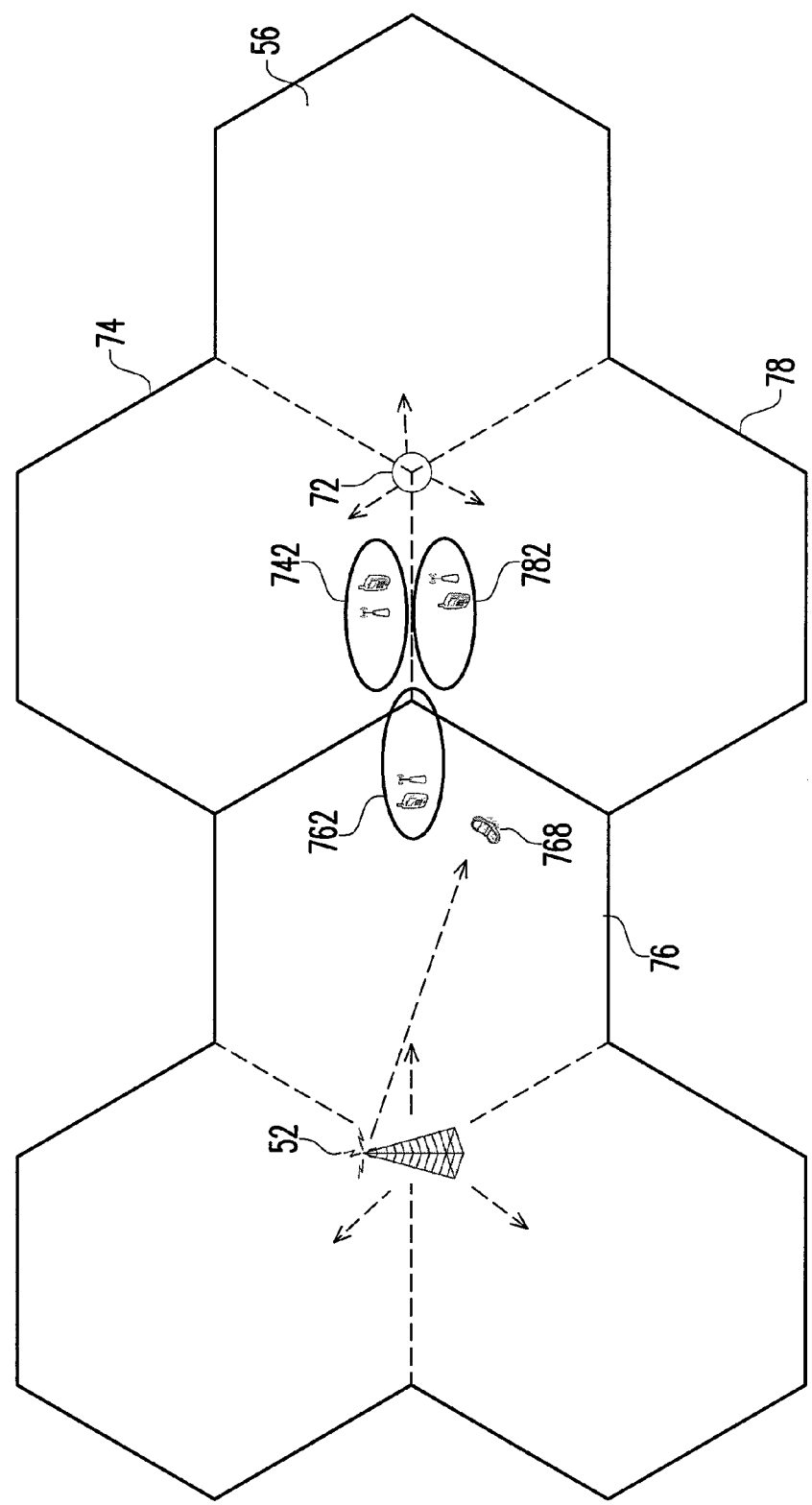
FIG. 7 is a schematic diagram illustrating a cell deployment example according to a fifth exemplary embodiment.

FIG. 7 is a schematic diagram illustrating a cell deployment example according to a fifth exemplary embodiment. A cell deployment example 70 illustrates both a cross-tier (femtocell-macrocell) and an intra-tier (femtocell-femtocell) interference scenario, in which the cell deployment example 70 includes two clusters. The first cluster consists of three macrocells within coverage of a macrocell ABS 52, where the one of the macrocells in the first cluster is a macrocell 76 including a femtocell 762 and at least a mobile station 768. On the other hand, the second cluster consisting of three macrocells being within a coverage of a macrocell ABS 72. Two macrocells in the second cluster are a macrocell 74 and a macrocell 78, in which the macrocell 74 includes a femtocell ABS 742, and the macrocell 78 includes a femtocell ABS 782. This exemplary scenario in the fifth exemplary embodiment often occurs since a femtocell ABS or femtocell BSs are usually deployed at cell edges of macrocells. The mobile station 768 is also close to the cell edges of the macrocells 74, 76 and 78. In addition, in the fifth exemplary embodiment, the femtocell ABS 742, the femtocell ABS 762 and the femtocell ABS 782 all use rank-1 pilot patterns.

In the fifth exemplary embodiment, cell IDs of the macrocell 74, the macrocell 76 and the macrocell 78 are respectively 0, 513 and 256. According to the segment deployment for a cell (also see the cluster diagram shown in FIG. 1A for a reference), segment IDs of the macrocell 74, the macrocell 76 and the macrocell 78 are respectively 0, 2 and 1. The femtocell ABS 742, the femtocell ABS 762 and the femtocell ABS 782 are respectively located in the macrocell 74 (with a segment ID n=0), the macrocell 76 (with a segment ID n=2) and the macrocell 78 (with a segment ID n=1). Thus, according to the equation (4) and the equation (6), when a segment ID of the femtocell ABS 742 is as i=1, and l=170, then the cell ID, IDcell, of the femtocell ABS 742 will be 426. Similarly, a segment ID of the femtocell ABS 762 is as i=0, and a segment ID of the femtocell ABS 782 is as i=2. The cell ID, IDcell, of the femtocell ABS 762 will be 170 with l=170, the cell ID of the femtocell ABS 782 will be 682 with l=170. In addition, the femtocell ABS 742, the femtocell ABS 762 and the femtocell ABS 782 all use rank-1 pilot patterns.

Furthermore, according the pilot selection engine described above, a pilot pattern $p_1 s_0$ is selected for the femtocell ABS 742, a pilot pattern $p_2 s_0$ is selected for the femtocell ABS 782 and a pilot pattern $p_0 s_0$ is selected for the femtocell ABS 762. The pilot pattern $p_1 s_0$, the pilot pattern $p_2 s_0$ and the pilot pattern $p_0 s_0$ are generated according to the step S352 to the step S356. The equation (5) is not used in the fifth exemplary embodiment since the selected pilot patterns are different just by using the equation (4) and following the step S352 to the step S356. The detailed calculation procedures are not repeated herein since the one of ordinary skill in the art can easily obtain the pilot pattern result by following the procedures illustrated in FIG. 3A and FIG. 3B for the femtocell ABS 742, the femtocell ABS 762 and the femtocell ABS 782.

Figure 8:
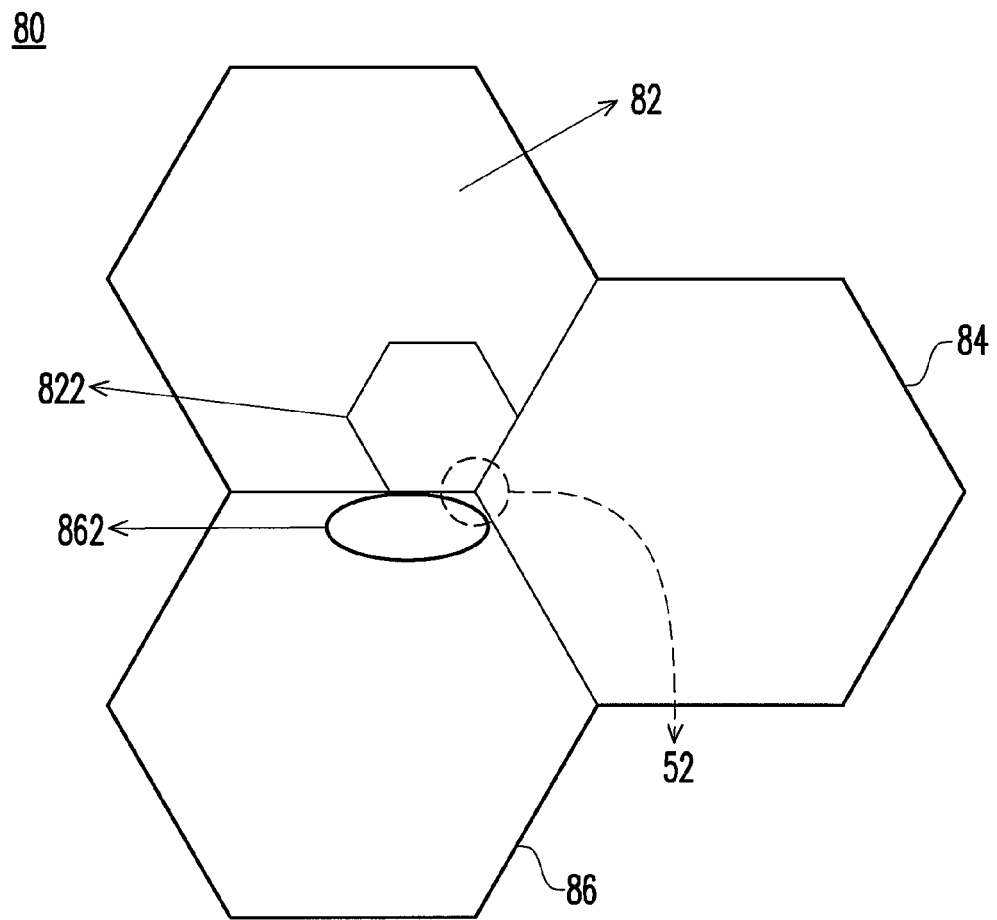
FIG. 8 is a schematic diagram illustrating a cell deployment example according to a sixth exemplary embodiment.

FIG. 8 is a schematic diagram illustrating a cell deployment example according to a sixth exemplary embodiment. A cell deployment example 80 illustrates a rank-2 pilot pattern selection scenario for a public ABS and a CSG-femtocell ABS based on their respective segment IDs. The cell deployment example 80 includes a cluster consisting of a macrocell 82, a macrocell 84 and a macrocell 86. The macrocell 82, the macrocell 84 and the macrocell 86 are all within coverage of a macrocell ABS 52, where the macrocell 82 includes a public ABS 822 and the macrocell 86 includes a femtocell ABS 862. The public ABS 822 is, for example, a relay ABS, a Hotzone ABS or an OSG-femtocell ABS. The CSG-femtocell ABS 862 is, for example, a CSG-Open ABS or a CSG-Closed ABS.

In the sixth exemplary embodiment, the cell ID can be calculated as IDcell=256n+l, where l has different values for different types of cells. For example, l for macrocell BSs is within a range of 0≤l≤85; l for public BSs is within a range of 86≤l≤z; for CSG-femtocell ABS is within a range of a+1≤l≤255. Segment IDs of the public ABS 822 and the femtocell ABS 862 are interlaced with each other within the cluster (or a sector). For another example, cell IDs of the macrocell 82, the macrocell 84 and the macrocell 86 can be respectively 0, 512 and 256. According to the cluster diagram shown in FIG. 1A, segment IDs of the macrocell 82, the macrocell 84 and the macrocell 86 are respectively selected as 0, 2 and 1.

In the sixth exemplary embodiment, if the segment IDs of the macrocell BSs (such as the macrocell ABS 82 or the macrocell ABS 86) is n, then the segment ID, i, of the public ABS (such as the public ABS 822) can be selected according to the equation (4) as i=mod((n+1), 3), and the segment ID, j, of the CSG-femtocell ABS (such as the femtocell ABS 862) can be selected according to the equation (5) as j=mod((n−1), 3). Furthermore, cell ID, IDcell of the public ABS can be selected as IDcell=256×i+l, and cell ID, IDcell of the CSG-femtocell ABS can be selected as IDcell=256×j+k, where 86≤l≤z and z+1≤k≤255.

On the other hand, in the present embodiment, if the segment ID of the macrocell ABS (such as the macrocell ABS 82 or the macrocell ABS 86) is n, then the segment ID, i, of the public ABS (such as the public ABS 822) can be also selected according to the equation (5) as i=mod((n−1), 3), and the segment ID, j, of the CSG-femtocell ABS (such as the femtocell ABS 862) can be selected according to the equation (4) as j=mod((n+1), 3). Furthermore, cell ID, IDcell of the public ABS can be selected as IDcell=256×i+l, and cell ID, IDcell of the CSG-femtocell ABS can be selected as IDcell=256×j+k, where 86 and z+1≤k≤255.

Figure 9:
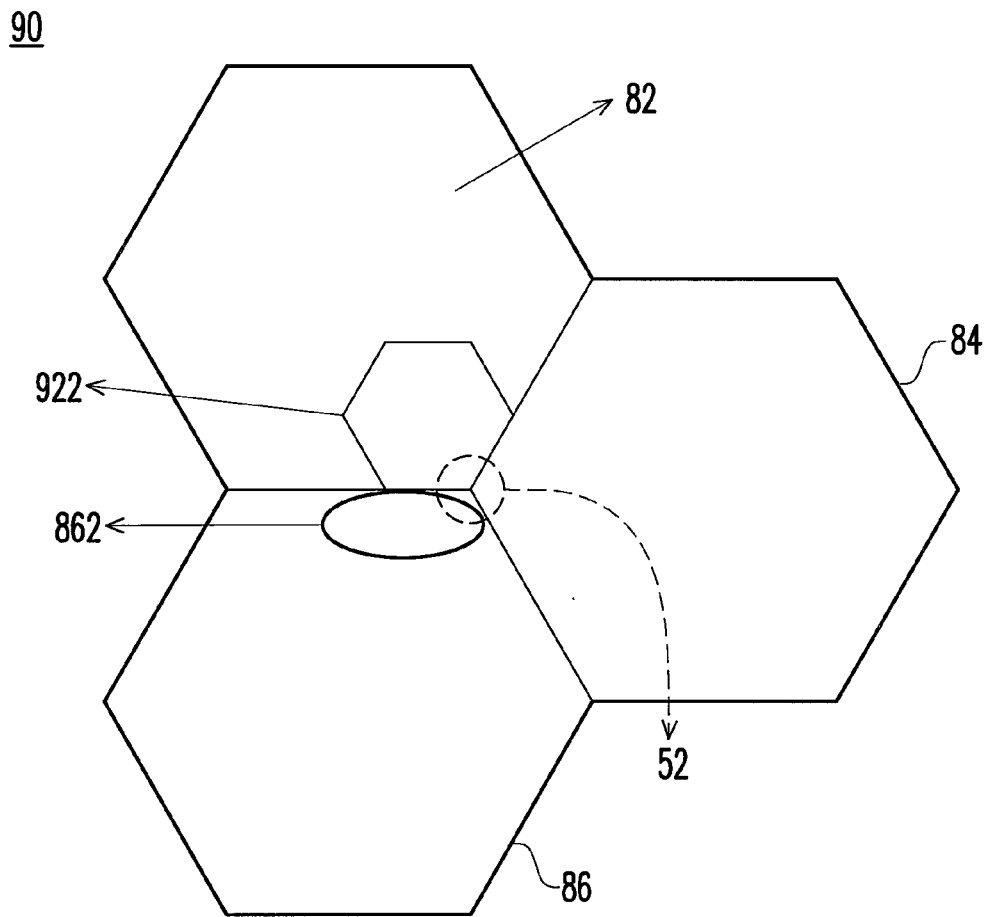
FIG. 9 is a schematic diagram illustrating a cell deployment example according to a seventh exemplary embodiment.

FIG. 9 is a schematic diagram illustrating a cell deployment example according to a seventh exemplary embodiment. A cell deployment example 90 illustrates a rank-2 pilot pattern selection scenario for a non-macrocell and non-femtocell ABS and a femtocell ABS based on their respective segment ID. The cell deployment example 90 includes a cluster consisting of a macrocell 82, a macrocell 84 and a macrocell 86. The macrocell 82, the macrocell 84 and the macrocell 86 are all within the coverage of a macrocell ABS 52, where the macrocell 82 includes a non-macrocell and non-femtocell ABS 922 and the macrocell 86 includes a femtocell ABS 862. The non-macrocell and non-femtocell ABS 922 is, for example, a relay ABS, a Hotzone ABS or an OSG-femtocell ABS. The femtocell ABS 862 is, for example, a CSG-Open ABS or a CSG-Closed ABS.

In the seventh exemplary embodiment, the cell ID can be calculated as IDcell=256n+l, where l has different values for different types of cells. For example, l for macrocell BSs is within a range of 0≤l≤85; l for non-macrocell and non-femtocell BSs is within a range of 86≤l≤z; l for femtocell ABS is within a range of z+1≤k≤255. Segment IDs of the non-macrocell and non-femtocell ABS 922 and the femtocell ABS 862 are interlaced with each other within the cluster (or a sector). For another example, cell IDs of the macrocell 82, the macrocell 84 and the macrocell 86 can be respectively 0, 512 and 256. According to the cluster diagram shown in FIG. 1A, segment IDs of the macrocell 82, the macrocell 84 and the macrocell 86 are respectively selected as 0, 2 and 1.

In the seventh exemplary embodiment, if the segment IDs of the macrocell BSs (such as the macrocell ABS 82 or the macrocell ABS 86) is n, then the segment ID, i, of the non-macrocell and non-femtocell ABS (such as the non-macrocell and non-femtocell ABS 922) can be selected according to the equation (4) as i=mod((n+1), 3), and the segment ID, j, of the femtocell ABS (such as the femtocell ABS 862) can be selected according to the equation (5) as j=mod((n−1), 3). Furthermore, cell ID, IDcell of the non-macrocell and non-femtocell ABS can be selected as IDcell=256×i+l, and cell ID, IDcell of the femtocell ABS can be selected as IDcell=256×j+k, where 86≤l≤z and z+1≤k≤255.

On the other hand, in the present embodiment, if the segment ID of the macrocell ABS (such as the macrocell ABS 82 or the macrocell ABS 86) is n, then the segment ID, i, of the non-macrocell and non-femtocell ABS (such as the non-macrocell and non-femtocell ABS 922) can also be selected according to the equation (5) as i=mod((n−1), 3), and the segment ID, j, of the femtocell ABS (such as the femtocell ABS 862) can be selected according to the equation (4) as j=mod((n+1), 3). Furthermore, cell ID, IDcell of the non-macrocell and non-femtocell ABS can be selected as IDcell=256×i+l, and cell ID, IDcell of the CSG-femtocell ABS can be selected as IDcell=256×j+k, where 86≤l≤z and z+1≤k≤255.

In summary, according to the exemplary embodiments of the disclosure, a pilot selection method for base stations in a heterogeneous wireless communication network, a wireless communication system and a base station thereof are proposed. Different rank-1 pilot pattern is selected for a femtocell ABS from its overlay macrocell ABSs using rank-1 and/or rank-2 pilot patterns. Also, different rank-1 pilot pattern is selected for the femtocell ABS from its neighboring femtocell ABSs using rank-1 pilot patterns. Moreover, different rank-2 pilot pattern is selected for a femtocell ABS from its overlay macrocell and non-macrocell and non-femtocell rank-2 pilot patterns.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A pilot selection method, adapted for selecting pilot patterns for at least a public advanced base station (ABS), at least a closed subscriber group (CSG) femtocell ABS and at least a macro cell ABS in a heterogeneous wireless communication network, the pilot selection method comprising:
using different segment IDs of the public ABS and the CSG femtocell ABS to a segment ID of the macro cell ABS, wherein the public ABS and the CSG femtocell ABS are co-located with the macro cell ABS; and
selecting a different segment ID of the public ABS to that of the CSG femtocell ABS;
wherein a first segment ID is used for the public ABS, a second segment ID is used for the CSG femtocell ABS, and a third segment ID is used for the co-located macro cell ABS, wherein the first segment ID, the second segment ID and the third segment ID are different from each other;
wherein the first segment ID selected for the public ABS is used to determine a rank-2 pilot pattern of the public ABS, the second segment ID selected for the CSG femtocell ABS is used to determine a rank-2 pilot pattern of the CSG femtocell ABS; and
wherein if the third segment ID of the co-located macro cell ABS is n, then the first segment ID, i, of the public ABS is selected according to the following equation (1) and the second segment ID, i, of the CSG femtocell ABS is selected according to the following equation (2):

$$i=\mod((n+1),3) \quad \text{equation (1)},$$

$$j=\mod((n-1),3) \quad \text{equation (2)},$$

wherein n is an integer number greater than or equal to zero and 1nod is modulo function.

2. The pilot selection method according to claim 1, wherein if the third segment ID of the co-located macro cell ABS is n, then the first segment ID, i, of the public ABS is selected according to the following equation (3) and the second segment ID, j, of the CSG femtocell ABS is selected according to the following equation (4):

$$i=\mod((n-1),3) \quad \text{equation (3)},$$

$$j=\mod((n+1),3) \quad \text{equation (4)},$$

wherein n is an integer number greater than or equal to zero and mod is modulo function.

3. The pilot selection method according to claim 1, wherein the public ABS is a one of a hot zone ABS, a relay ABS, or an OSG femtocell ABS.

4. A wireless communication system, comprising:
at least a macro cell advanced base station (ABS);
at least a public ABS, co-located with the macro cell ABS;
and at least a closed subscriber group (CSG) femtocell ABS, co-located with the macro cell ABS, wherein the public ABS and the CSG femtocell ABS respectively use different segment IDs to a segment ID of the macro cell ABS, and the public ABS selects a different segment ID to that of the CSG femtocell ABS;
wherein the public ABS uses a first segment ID, the CSG femtocell ABS uses a second segment ID and the co-located macro cell ABS uses a third segment ID, wherein the first segment ID, the second segment ID and the third segment ID are different from each other;
wherein the public ABS selects the first segment ID to determine a rank-2 pilot pattern of the public ABS, the CSG femtocell ABS selects the second segment ID is used to determine a rank-2 pilot pattern of the CSG femtocell ABS; and
wherein if the third segment ID of the co-located macro cell ABS is n, then the first segment ID, i, of the public ABS is selected according to the following equation (1) and the second segment ID, i, of the CSG femtocell ABS and the third se~nent ID, n, of the co-located macro cell AB S is selected according to satisfy the following equation (1) or the following equation (2):

$$i=\mod((n+1),3) \quad \text{equation (1)},$$

$$j=\mod((n-1),3) \quad \text{equation (2)},$$

wherein n is an integer number greater than or equal to zero and mod is modulo function.

5. The wireless communication system according to claim 4, wherein if the third segment ID of the co-located macro cell ABS is n, then the first segment ID, i, of the public ABS is selected according to the following equation (3) and the second segment ID, j, of the CSG femtocell ABS is selected according to the following equation (4):

$$i=\mod((n-t),3) \quad \text{equation (3)},$$

$$j=\mod((n+1),3) \quad \text{equation (4)},$$

wherein n is an integer number Neater than or equal to zero and mod is modulo function.

6. The wireless communication system according to claim 4, wherein the public ABS is a one of a hot zone ABS, a relay ABS, or an OSG femtocell ABS.

7. A closed subscriber group femtocell advanced base station, CSG femtocell ABS base station, co-located with a macro cell advanced base station (ABS) and neighboring to at least a public ABS, wherein CSG femtocell ABS uses a different segment ID to a segment ID of the macro cell ABS, and CSG femtocell AB S the base station selects a different segment ID to that of the public ABS;
wherein the public ABS uses a first segment ID, the CSG femtocell ABS uses a second segment ID and the co-located macro cell ABS uses a third segment ID, wherein the first segment ID, the second segment ID and the third segment ID are different from each other;
wherein the public ABS selects the first segment ID to determine a rank-2 pilot pattern of the public ABS, the CSG femtocell ABS selects the second segment ID to determine a rank-2 pilot pattern of CSG femtocell ABS the base station; and
wherein if the third segment ID of the co-located macrocell ABS is n, then the first segment ID, i, of the public ABS is selected according to the following equation (1)

and the second segment ID, i, of CSG femtocell ABS the base station is selected according to the following equation (2):

$$i = \mod((n+1), 3) \quad \text{equation (1)},$$

$$j = \mod((n-1), 3) \quad \text{equation (2)},$$

wherein n is an integer number greater than or equal to zero and mod is modulo function.

8. The CSG femtocell ABS base station according to claim 7, wherein if the third segment ID of the co-located macro cell ABS is n, then the first segment ID, i, of the public ABS is selected according to the following equation (3) and the second segment ID, j, of the CSG femtocell ABS the base station is selected according to the following equation (4):

$$i = \mod((n-1), 3) \quad \text{equation (3)},$$

$$j = \mod((n+1), 3) \quad \text{equation (4)},$$

wherein n is an integer number greater than or equal to zero and rood is modulo function.

9. The CSG femtocell ABS base station method according to claim 7, wherein the public ABS is a one of a hot zone ABS, a relay ABS, or an OSG femtocell ABS.

10. The CSG femtocell ABS base station according to claim 7, wherein CSG femtocell ABS the base station is a femtocell ABS or a public ABS or a macro cell ABS.

* * * * *